US012032270B2

(12) United States Patent
Jain et al.

(10) Patent No.: US 12,032,270 B2
(45) Date of Patent: Jul. 9, 2024

(54) TUNABLE DIELECTRIC METASURFACE FOR BEAM STEERING

(71) Applicant: LUMINAR TECHNOLOGIES, INC., Orlando, FL (US)

(72) Inventors: Aditya Jain, Minneapolis, MN (US); Yueyang Chen, Cupertino, CA (US)

(73) Assignee: Luminar Technologies, Inc., Orlando, FL (US)

( * ) Notice: Subject to any disclaimer, the term of this patent is extended or adjusted under 35 U.S.C. 154(b) by 166 days.

(21) Appl. No.: 17/876,656

(22) Filed: Jul. 29, 2022

(65) Prior Publication Data

US 2023/0079518 A1 Mar. 16, 2023

Related U.S. Application Data

(60) Provisional application No. 63/244,401, filed on Sep. 15, 2021.

(51) Int. Cl.
*G02F 1/35* (2006.01)
*G02B 5/08* (2006.01)
*G02F 1/00* (2006.01)

(52) U.S. Cl.
CPC ......... *G02F 1/3546* (2021.01); *G02B 5/0841* (2013.01); *G02F 1/0063* (2013.01)

(58) Field of Classification Search
CPC .... G02F 1/3546; G02F 1/0063; G02B 5/0841
USPC ....................................................... 359/287
See application file for complete search history.

(56) References Cited

U.S. PATENT DOCUMENTS

| | | | |
|---|---|---|---|
| 10,720,712 B2 | 7/2020 | Foo | |
| 10,915,002 B2 | 2/2021 | Akselrod | |
| 11,024,977 B2 | 6/2021 | Olk et al. | |
| 2011/0164308 A1 | 7/2011 | Arsenault et al. | |
| 2018/0083364 A1 | 3/2018 | Foo | |
| 2018/0241131 A1 | 8/2018 | Akselrod | |
| 2021/0181594 A1 | 6/2021 | Jain et al. | |

FOREIGN PATENT DOCUMENTS

| | | |
|---|---|---|
| EP | 3667361 A1 | 6/2020 |
| WO | 2018054204 A1 | 3/2018 |
| WO | 2021145819 A1 | 7/2021 |

OTHER PUBLICATIONS

Lewi T. et al., "Thermally Reconfigurable Meta-Optics", IEEE Photonics Journal, vol. 11, No. 2, DOI: 10.1109/JPHOT.2019.2916161, dated Apr. 2019.
Nemati A. et al., "Tunable and reconfigurable metasurfaces and metadevices", Opto-Electronic Advances, Review, vol. 1, No. 5, DOI: 10.29026/oea.2018.180009, dated 2018.
Spannhake, Jan , et al., "High-temperature MEMS Heater Platforms: Long-term Performance of Metal and Semiconductor Heater Materials", Sensors, vol. 6, Apr. 7, 2006, 405-419.

*Primary Examiner* — William Choi

(57) ABSTRACT

A metasurface includes a plurality of Bragg mirrors, each having a defect cavity therein, arrayed in a grid. A heat source is provided for each of the plurality of Bragg mirrors. Each heat source is positioned to selectively modulate heat applied to its respective Bragg mirror and to impart a different phase shift via the applied heat from the heat source.

20 Claims, 12 Drawing Sheets

Q ~ 4000
Linewidth = 0.38nm

FOV: -30 to 30 Degrees

TUNABLE DIELECTRIC METASURFACE FOR BEAM STEERING

CROSS-REFERENCE RELATED TO APPLICATION(S)

This application claims the benefit of U.S. provisional application 63/244,401, filed on Sep. 15, 2021, the content of which is hereby incorporated by reference in its entirety.

SUMMARY

In one embodiment, a metasurface includes a plurality of Bragg mirrors, each having a defect cavity therein, arrayed in a grid. A heat source is provided for each of the plurality of Bragg mirrors. Each heat source is positioned to selectively modulate heat applied to its respective Bragg mirror and to impart a different phase shift via the applied heat from the heat source.

In another embodiment, an apparatus includes a substrate and a plurality of pillars connected to the substrate at each end thereof. The plurality of pillars are disposed end to end and supported by support structures on the substrate, separated from each other and from the substrate by air gaps, and arrayed in a grid. Each pillar includes a pair of Bragg mirrors having a defect cavity therebetween, and a heat source positioned to selectively modulate heat applied to its respective defect cavity and to impart a different phase shift via the applied heat from the heat source.

In another embodiment, a method of beam steering includes providing an array of beam steering pillars, each pillar having a pair of Bragg mirrors surrounding a defect cavity, and thermally changing a refractive index of the cavities in a pattern to induce beam steering through constructive and destructive interference of reflected light from the beam steering pillars.

This summary is not intended to describe each disclosed embodiment or every implementation of tunable dielectric metasurfaces for beam steering as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
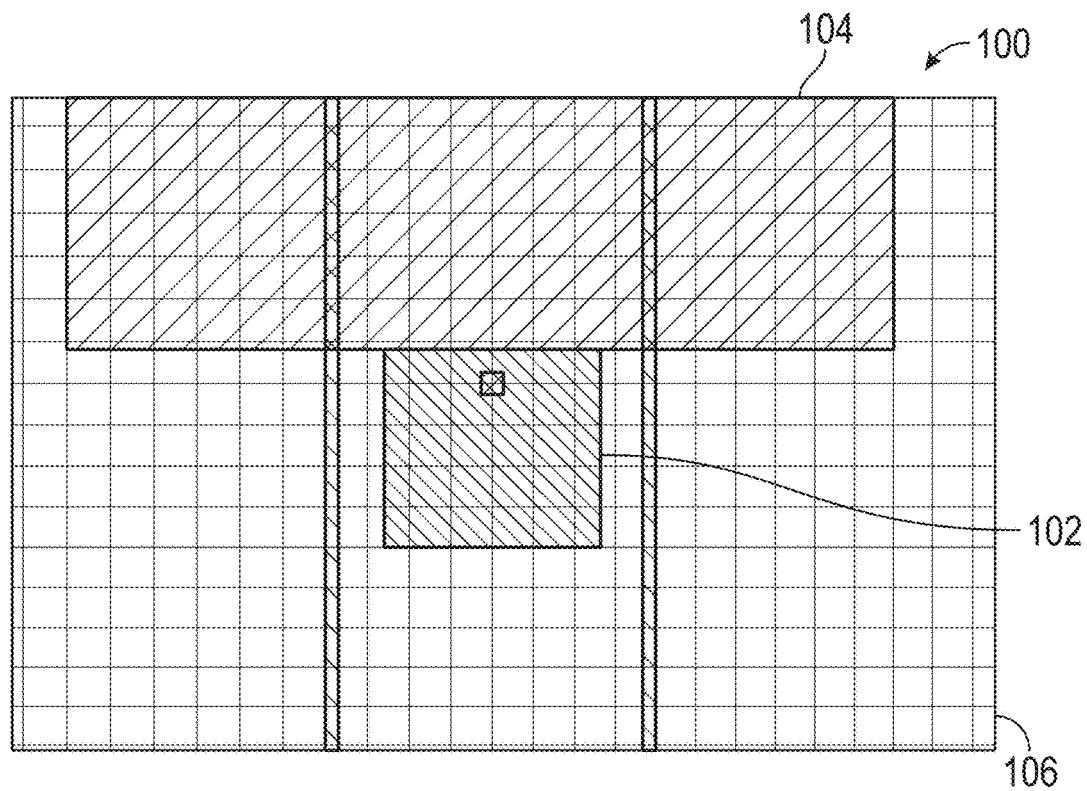
FIG. 1 is an elevation view of a flat dielectric grating for resonance.

In general, embodiments of the disclosure relate to tunable dielectric metasurfaces for beam steering. Such devices may include a metasurface with periodically repeated unit cells that serve to controllably steer light.

Previous beam steering options have included optical arrays for optical beam steering. One such previous beam steering option is a traditional optical phased array (OPA). In this case, beam steering is accomplished in a waveguide coupled device. Light is incident on the OPA. The light is taken onto the OPA through a lensed fiber input, and flows through a series of splitters to electrodes, and then to grating couplers. Programmable phase shifters are used to steer the beam. However, each splitter and coupler introduces loss of the incident light. For example, each splitter entails about a 0.3 dB loss. To split light into eight beams, for example, each light path flows through four splitters, for a 1.2 dB loss. There is additional loss from electrodes and gratings. Most practical OPA beam splitters have loss on the order of 6-12 dB (about 75% to 94% overall loss). Such large losses make it difficult to achieve a long range splitter, and use increased power even to pass light through the optical array to the grating couplers.

In order to keep a larger portion of usable light not lost in the process, a metasurface may be used, for example a nano resonator metasurface may be used to provide multiple phases of light from its various cells. In such a configuration, a voltage is applied to the cells to impart a different phase shift to each different resonator, and light is reflected back at different phases. Such a metasurface may have about a 2-3 dB loss.

Some beam steering solutions use tunable metasurfaces. Metasurfaces can be tuned in different ways, such as by the use of phase change material with liquid crystals where an applied voltage changes a refractive index of the surface. Other options use quantum wells. Quantum wells do not have enough index change to get full 2n phase change. Some tunable metasurfaces use a Mie resonator to confine light in a small volume. However, the optical quality factor (Q) of Mie resonators is low and crosstalk between neighboring unit cells is high.

A metasurface has many resonators, such as in an array. In order to provide effective beam steering, the phase shift of the resonators of a surface should be able to provide a full 2πc phase change, or as close to that as possible. A full phase change of 2n is often described as phase change from $-\pi$ to $\pi$ (or, 0 to $2\pi$).

Phase change may be induced in resonators by bouncing light therein using materials of different reflectivities. One example of such a configuration is shown as a dielectric block in FIG. 1, which is described below.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 shows a flat dielectric grating 100, with a silicon section 102 and a silicon dioxide ($SiO_2$) section 104. There is a reflective index contrast between the two sections 102 and 104. When light shines into the grating 100 from the top, the light gets trapped in the section 102 and resonates, therein, bouncing between a substrate 106 and the $SiO_2$ 104. The properties of such a resonator may be changed by changing the material or geometry used in the grating 100. This may allow for a phase change or a wavelength change.

Figure 2:
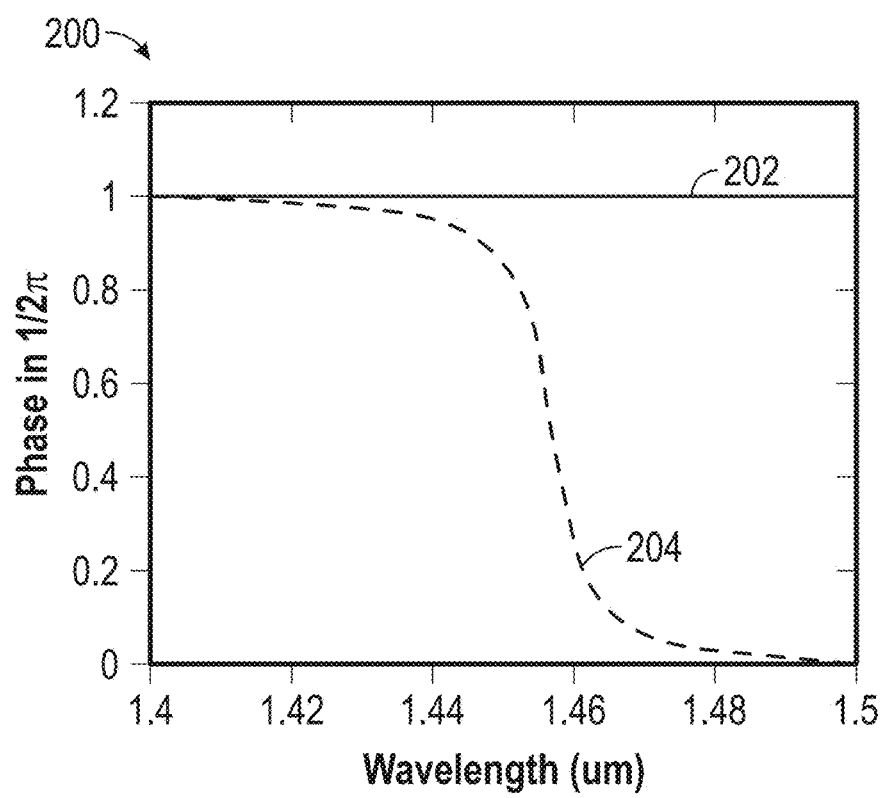
FIG. 2 is a graph of amplitude and wavelength for a Fabry-Perot cavity.

FIG. 2 shows a spectrum graph 200 for a representative cavity such as a Fabry-Perot cavity. Although the amplitude of the light remains constant as shown at 200, the phase 204 (shown on the vertical axis as phase/$2\pi$) changes a full $2\pi$ between 1.4 and 1.5 microns in wavelength. A most rapid section of phase change is between about 1.44 and 1.46 microns. The amplitude remains constant and the phase changes rapidly. The graph indicates that there is a rapid phase change between wavelengths of 1.44 and 1.46 microns. However, wavelength changes are more difficult to implement in practice.

An asymmetric Fabry-Perot cavity includes a top mirror having a reflectivity (R) on a cavity side of less than 1. A bottom mirror has R=1. Light shined into the cavity will bounce (or resonate) between the two mirrors. Because the R<1 for the top mirror, some light escapes the cavity at the top. R for the top mirror may be chosen so that there is sufficient resonation within the cavity, but enough light leaks out to make the resonator useful.

Embodiments of the present disclosure change the refractive index of a cavity to allow for phase change at constant wavelength. The embodiments of the present disclosure provide higher Q and lower crosstalk, in one embodiment using Bragg mirrors (also called distributed Bragg reflectors (DBRs)) to confine light in the vertical direction within a plurality of resonators. A heater on each resonator allows for adjustment of the Bragg mirrors to change the refractive indices of the cavities, allowing for the provision of phase shifting of light for beam steering. Embodiments of the disclosure provide a thermally tuned cavity that exhibits reduced or nearly eliminated thermal and optical crosstalk with its neighboring unit cell. Crosstalk is reduced by confining the light in the vertical direction using a Bragg mirror. In addition, high Q is also obtained to achieve efficient tunability. The embodiments use a thermally tuned design that avoids Mie resonance and maintains high Q with a properly placed heater. In one embodiment, the heater also serves as a reflector to provide a reflective metasurface with a full or near full $2\pi$ phase shift.

A Bragg mirror is generally a mirror structure comprising an alternating sequence of layers of two different optical materials. In one embodiment, a Bragg mirror as used in the embodiments comprises alternate layers of Si and silicon nitride (in one embodiment $Si_3N_4$) or diamond like carbon (DLC). A heater is provided at one end of the Bragg mirror. A Bragg mirror and heater combined are referred to as a pillar or stack in this disclosure. In one embodiment, multiple pillars are supported at their ends by a substrate, so they are thermally isolated from the surrounding structures by air gaps except at the contact point of the ends to the substrate. Each pillar of a plurality of pillars can be given a different phase shift of incident light via applied heat from the heater. This allows beam steering to on the order of −30 to 30 degrees.

Figure 3:
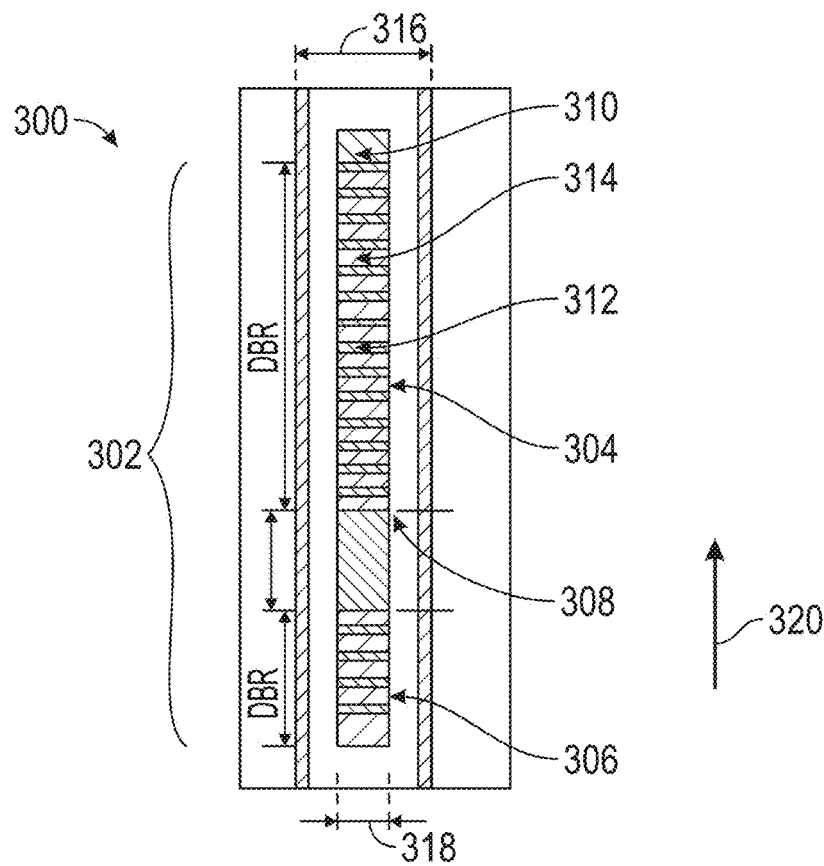
FIG. 3 is an illustration of a pillar for beam steering according to an embodiment of the present disclosure.

A resonator 300 according to an embodiment of the present disclosure is shown in FIG. 3. Resonator 300 (e.g., a pillar) comprises a mirror stack 302 and a heater 310. Mirror stack 302 comprises a first mirror 304, a second mirror 306, and a cavity 308 between the two mirrors 304 and 306. Mirrors 304 and 306 are in one embodiment DBRs. DBR 304 and DBR 306 in one embodiment comprise a plurality of alternating layers of polysilicon 312 and silicon nitride (variants of SiN) or DLC 314. In one embodiment, the silicon nitride 314 material is $Si_3N_4$. The cavity 308 is in one embodiment polysilicon. The refractive indices of the DBR mirrors are, in one embodiment, R=1 for DBR 304 and R<1 for DBR 306. In one embodiment, a DBR R range for DBR 306 is 0.98<R<0.99.

The materials of the mirror stack 302 are optically transparent, and have differing refractive indices. They are also all good thermal conductors. For example, polysilicon has a refractive index of about 3.48 and a thermal conductivity on the order of 15 watts per meter thickness (W/mk). Silicon nitrides have a refractive index of about 2 and a thermal conductivity of about 2 W/mk. DLC has a refractive index of about 2 and a thermal conductivity of about 4.5 W/mk. The materials are readily available and the pillars are easily made with simple deposition and etching techniques know to those of ordinary skill in the art.

Embodiments of the disclosure use thermal heating to change the refractive index of the cavity 308. Polysilicon materials have a property that changes the refractive index upon heating. Polysilicon has a thermo-optic coefficient of about 1×10⁻⁴/degree Celsius. Therefore, heating polysilicon 100 degrees Celsius results in a refractive index change on the order of 0.01.

The heater 310 is in one embodiment gold. Heater 310 is coupled to a voltage supply (not shown) to provide a current therethrough which heats the heater 310 for thermal variation of the mirror stack, particularly the cavity 308, to change the refractive index of the cavity 308. When the heater is activated, the cavity temperature can be adjusted to change the refractive index thereof. Different voltages result in different currents and different refractive index changes in the cavity material. Heater 310 is identified as gold, but it should be understood that different materials may be used without departing from the disclosure, including but not limited to tungsten or the like.

Incident light in the direction of arrow 320 enters the resonator 300, travels through the bottom DBR 306 and the cavity 308, and bounces off the first DBR 304 which has in one embodiment a R=1. The light reflects off the first DBR 304, and is partially trapped in the cavity 308 when it reflects back through the cavity 308, and reflects partially off the second DBR 306 back into the cavity 308. The light bounces, or resonates, in the cavity 308, accumulating phase change as it resonates.

Each resonator of an array of resonators (described further below) may be heated to a specific temperature to change the refractive index of its respective cavity. When the cavity heats up, its refractive index change allows for a different phase shift of the incoming light based on the change in refractive index of the cavity. Each unit cell (e.g., each resonator) has a particular temperature, and each of the pillars has its own heater and its own temperature heating differently. Therefore, in a resonator array of a plurality of resonators, for example, 100, each having a cavity at a preset temperature, optical interference of the reflected light out of the resonator forms a pattern, which allows for beam steering of the incoming incident light.

Figure 4:
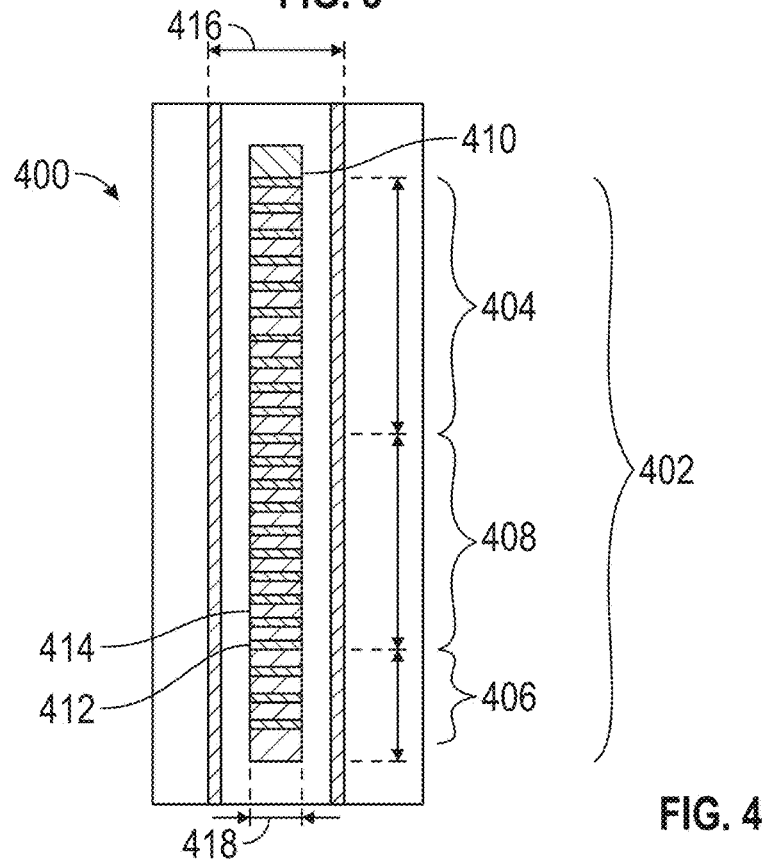
FIG. 4 is an illustration of a pillar for beam steering according to another embodiment of the present disclosure.

An alternate design of a resonator 400 is shown in FIG. 4. Resonator 400 (e.g., a pillar) comprises a mirror stack 402 and a heater 410. Mirror stack 402 comprises a first mirror 404, a second mirror 406, and a cavity 408 between the two mirrors 404 and 406. Mirrors 404 and 406 are in one embodiment DBRs. DBR 404 and DBR 406 in one embodiment comprise a plurality of alternating layers of polysilicon 412 and silicon nitride (variants of SiN, with $Si_3N_4$ being the most thermodynamically stable) or DLC 414. In one embodiment, the silicon nitride 414 material is $Si_3N_4$. The cavity 408 is in one embodiment a plurality of alternating layers of polysilicon and silicon nitride. The refractive indices (n) of the DBR mirrors are, in one embodiment, n=3.48 for polysilicon, and n≈2 for $Si_3N_4$.

In this embodiment, the first DBR 404 has a period of 335 nanometers (nm), with eight layers each of polysilicon 412 122 nm thick, and silicon nitride/DLC 414 213 nm thick. Second DBR 406 has a period of 335 nm, with two layers each of polysilicon 412 122 nm thick, and silicon nitride/DLC 414 213 nm thick. The cavity comprises a stack of six layers each of silicon 412 and silicon nitride/DLC 414 with a DBR period tapered in the six layers from 335 nm to 283 nm. The cavity 408 exhibits the same type of adjustable refractive index with heating by heater 410 as in cavity 308 of resonator 300.

In an array of resonators 300 or 400, the pitch, or distance between resonators, is set at just below the wavelength of light that is used for the incident light on the array. In one embodiment, the subwavelength period (pitch) 316 or 416 is about 1.5 microns. The resonators have a width 318, 418 of about 650 nm, leaving a distance between pillars in one embodiment of about 850 nm. This air gap allows for thermal isolation between adjacent pillars, which is discussed further below.

Figure 5:
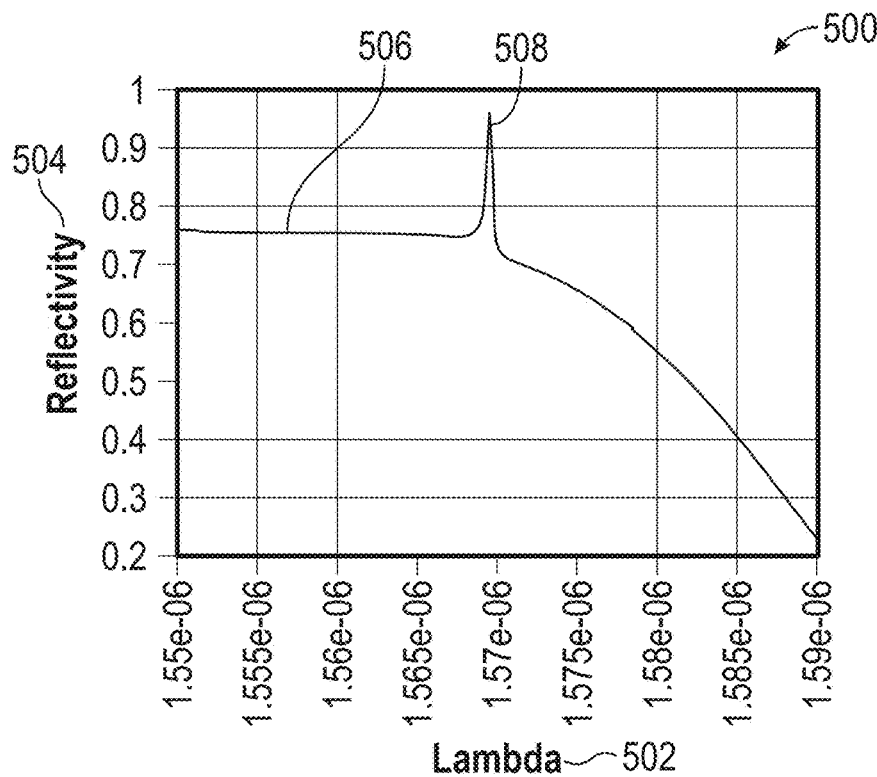
FIGS. 5-8 are graphs of reflectivity and phase that are associated with wavelengths of light that are used with embodiments of the present disclosure.
Figure 6:
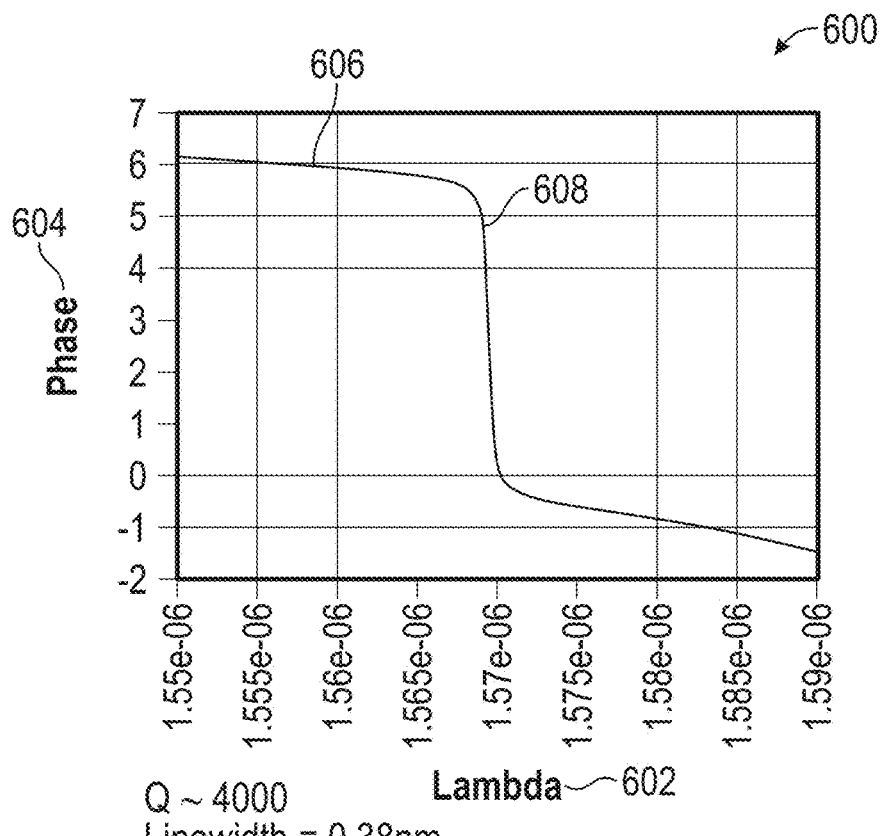

FIGS. 5-8 are graphs of reflectivity and phase that are associated with the wavelengths of light that are used with embodiments of the present disclosure. The wavelength will be determined in large part by the materials used in the pillars. Graphs of reflectivity and phase are shown in FIGS. 5-6. Embodiments of the present disclosure use a near constant reflectivity and a phase change of close to $2\pi$.

FIG. 5 is a graph 500 of wavelength 502 on the horizontal axis versus reflectivity 504 on the vertical axis. The reflectivity line 506 shows a sharp peak 508 at about 1.57-1.58 microns. It is the wavelength at this peak of reflectivity 508 where phase change occurs. A peak in reflectivity also reflects a high optical quality factor Q. With a higher Q, there are increased and sharper resonances in a cavity such as cavities 308 and 408. With a higher Q, less heat is used, and with less heat, less power is consumed. As power is a factor in resonator designs, lower power consumption is an advantage.

FIG. 6 is a graph 600 of wavelength 602 on the horizontal axis versus phase 604 on the vertical axis. As may be seen by the phase line 606, a sharp phase change from near $2\pi$ to near 0 occurs at about 608. The wavelength there corresponds to the reflectivity peak 508 of FIG. 5, at about 1.57-1.58 microns. With the high Q at about 1.57 microns, the more accumulated phase change is made possible by the resonances of light in the cavities 308, 408.

Figure 7:
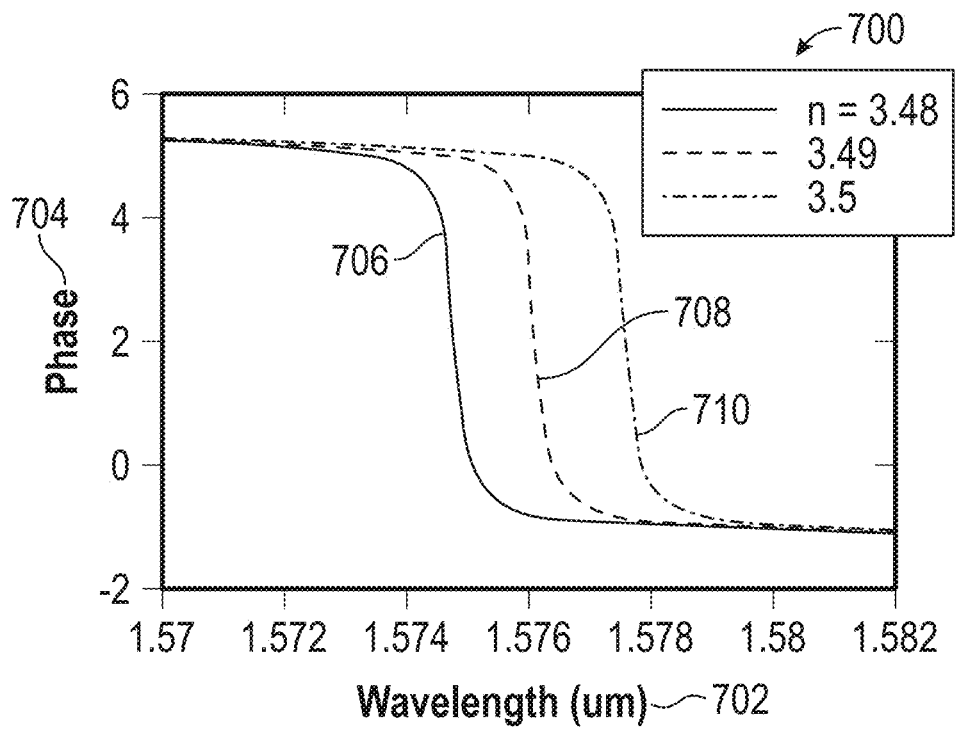

Once the general approximate wavelength of between 1.57-1.58 microns is determined, a change in the refractive index is shown in FIG. 7. FIG. 7 is a graph 700 showing wavelength 702 on the horizontal axis versus phase 704 on the vertical axis, and includes lines 706, 708, and 710 for refractive indices of 3.48, 3.49, and 3.50 respectively. Since wavelength is maintained at a constant in embodiments of the present disclosure, the refractive index changes are initiated by temperature change of the cavity material. As has been mentioned, a 100 degree Celsius increase in temperature changes the refractive index of polysilicon by 0.01. Each line 706, 708, 710, therefore, is indicative of a 100 degree difference in temperature instead of a change of wavelength for embodiments of the present disclosure.

Figure 8:
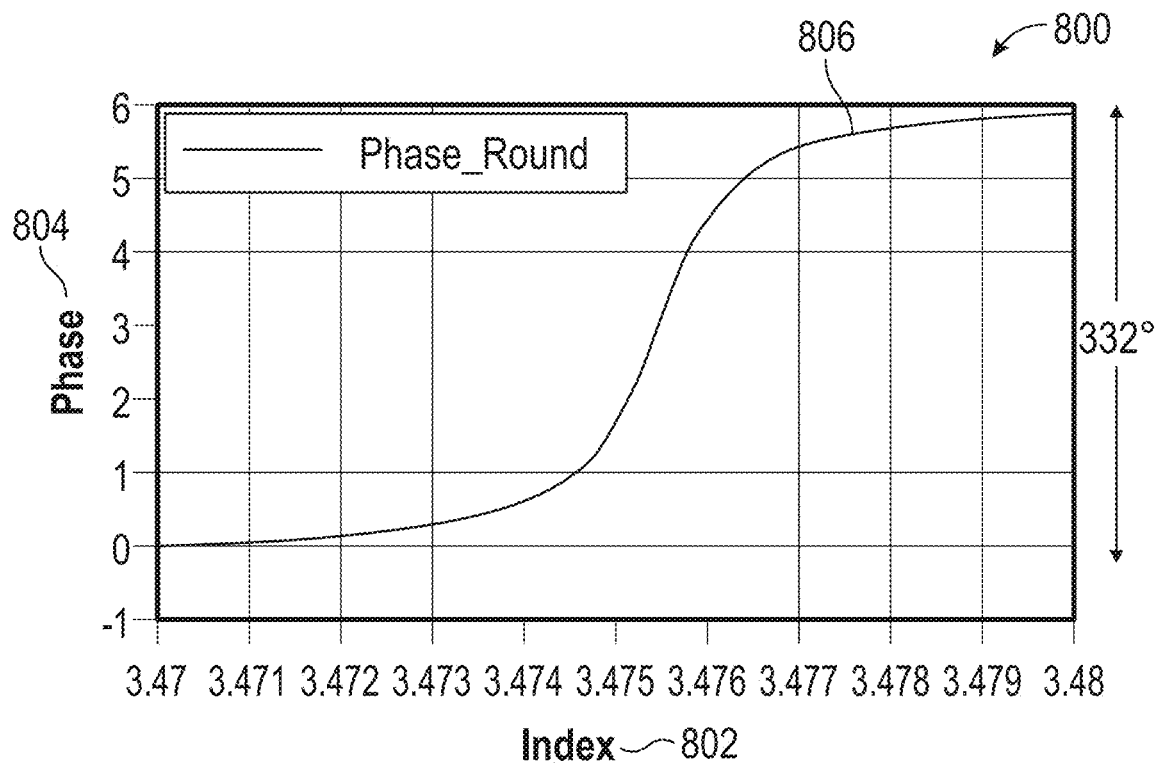

In FIG. 8, graph 1200 shows refractive index 802 on the horizontal axis versus phase 804 on the vertical axis. Phase line 806 indicates a phase change of about 332 degrees, which is not a full 2n, but is enough for adequate beam steering. The phase line 806 has its phase change of about 332 degrees from an index change of about 3.47 to about 3.48. This amount of refractive index change about how much may be realistically accomplished using heaters such as heaters 310 and 410.

Figure 9:
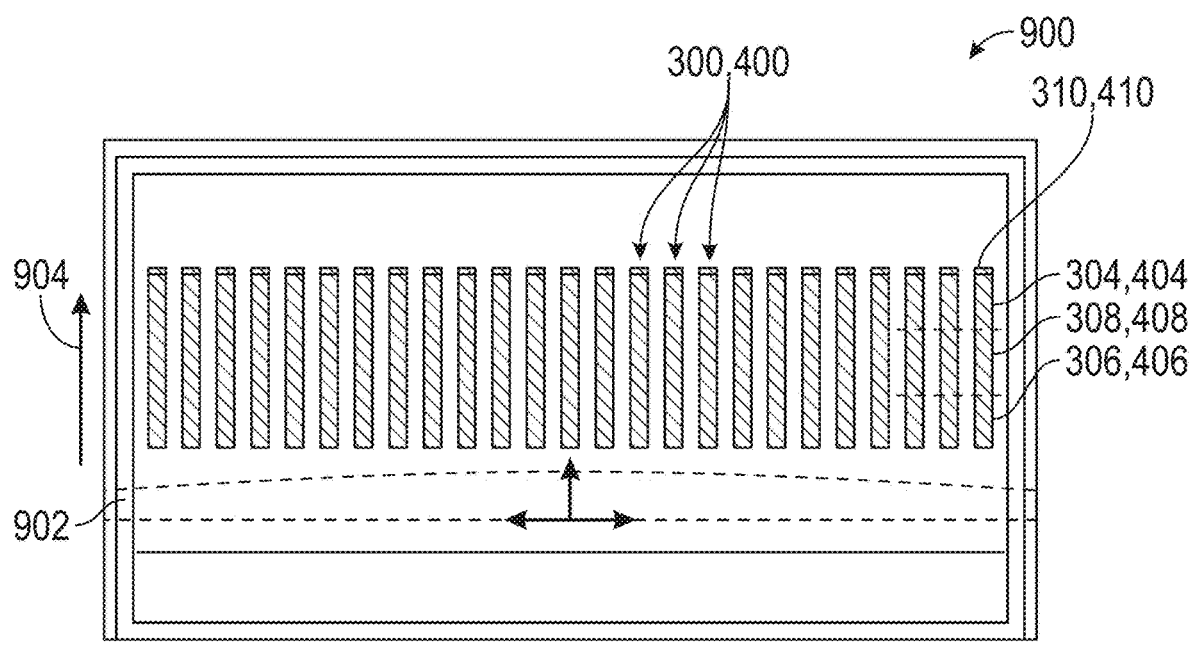
FIG. 9 is a side view of a portion of a beam steering apparatus according to an embodiment of the present disclosure.
Figure 10:
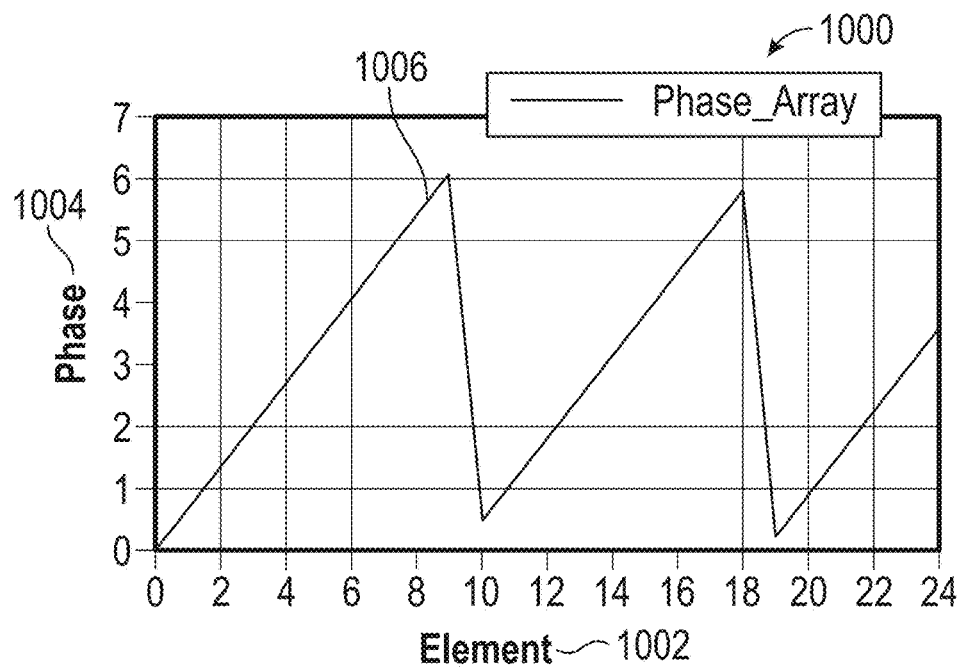
FIG. 10 is a graph of an array element versus phase plot according to an embodiment of the present disclosure.

With the wavelength and refractive index changes determined, operation of an array of resonators such as those described above is further discussed below. One example of a phase array 900 is shown in side elevation view in FIG. 9. Phase array 900 shows a plurality of pillars 300, 400 arranged in an array. Pillars 300, 400 comprise stacks of first DBR 304, 404, second DBR 306, 406, and cavity 308, 408, topped by heater 310, 410, as described above. The pillars 300, 400 are arranged in an array. Incident light 902 is shined into the array from its bottom in the direction of arrow 904. The heaters 310, 410 are provided with currents sufficient to generate refractive index changes in each cavity 308, 408, according to a pattern of phase shifts (see FIG. 10). Each pillar is in one embodiment its own element, and the element heating is performed so as to generate a phase pattern in the array (FIG. 10). While pillars are shown as pillars 300, 400 in FIG. 9, it should be understood that other DBR stack pillars may be used without departing from the scope of the disclosure.

FIG. 10 is a graph 1000 of pillar array element number on the horizontal axis 1002 versus phase on the vertical axis 1004. Array pattern line 1006 is shown as a sawtooth pattern of phase applied to the elements of the array of FIG. 9. For example, in the pattern 1006, there is a zero phase shift on element 0, and the phase shift increases linearly up to about element 9 at about a 332 degree phase shift. Then the pattern repeats, dropping between element 9 and element 10 back to a near zero phase shift, and increasing linearly again to element 18, and so on through all the elements of the array 900. Each element of the array 900 has an amount of heating sufficient to induce the phase pattern 1006, giving the phase 1006 its sawtooth pattern. This sawtooth pattern 1006 applied to the array results in beam steering.

The beam steering is performed with a variety of phase pattern lines like 1006. The phase pattern 1006 of FIG. 10 is used to generate a beam steering of 10 degrees, as shown in farfield relative strength and farfield dB plots in FIGS. 11 and 12, respectively. Each applied pattern of heating to the array elements of array 900 creates a different pattern, with each pattern having its particular amount of beam steering.

Figure 11:
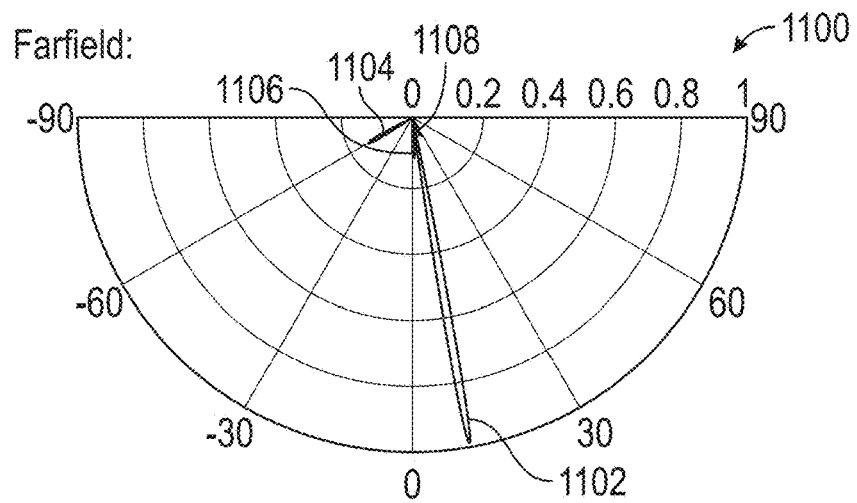
FIGS. 11-13 illustrate plots of beam steering according to embodiments of the present disclosure.
Figure 12:
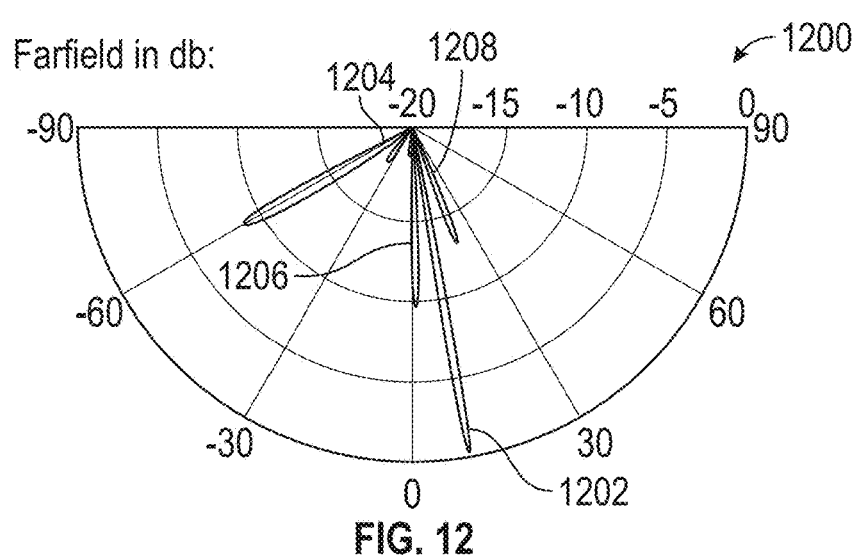

Referring now to FIGS. 11 and 12, beam steering is shown in the form of a farfield absolute relative strength plot 1100 in FIG. 11, and a dB plot in FIG. 12. FIG. 11 shows plot 1100 having a main lobe 1102 at 10 degrees and side lobes 1104, 1106, and 1108 at about −60 degrees, 0 degrees, and −20 degrees respectively. Other side lobes may be present, but are not illustrated in the plot 1100. The main lobe is the highest amplitude lobe and is the steered beam of the sawtooth pattern 1006 of FIG. 10. FIG. 12 shows a dB plot 1200 of the lobes in dB, with main lobe 1202 at about 0 dB and 10 degrees, whereas side lobes 1204, 1206, and 1208 are about −8 dB and −60 degrees, −9 dB and 0 degrees, and −13 dB and 20 degrees respectively. Again, other side lobes may be present, but are not illustrated in the plot 1200.

The patterns of lobes in FIGS. 11 and 12 are created with constructive and destructive interference patterns, as are known in the art. When side lobes are at about −10 dB, they do not affect steering. The plots 1100 and 1200 are indicative of changing the incident beam by 10 degrees. This is a result of the phase pattern shown in FIG. 10. That phase configuration, accomplished by changing the voltage into the heaters, and therefore changing the refractive indices of the pillars, allows for beam steering to the 10 degree steering shown.

Figure 13:
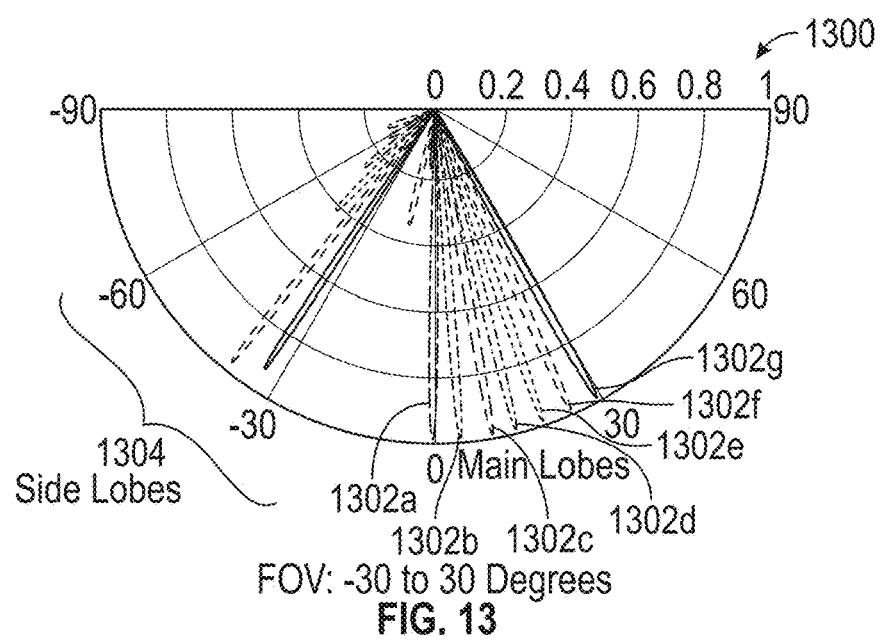

Altering the phase configuration by changing the heating of the heaters 310, 410 allows for beam steering to different angles. For example, as shown in FIG. 13, beam steering possible with configurations of the present disclosure is approximately −30 to 30 degrees. Main lobe beam steering for 0, 5, 10, 15, 20, 25, and 30 degrees are shown as lobes 1302a, 1302b, 1302c, 1302d, 1302e, 1302f, and 1302g, respectively. Side lobes 1304 associated with the various beam steering configurations are also shown. The main lobes may be steered in a negative direction as well by altering the sawtooth pattern described above. The steering is in one embodiment dependent on the slope of the sawtooth such as that shown in FIG. 10. Changing the slope of the sawtooth pattern allows the beam steering to be changed. The slope of the sawtooth pattern is changed by changing the voltages into the heaters. Steering beyond −30 and 30 degrees results in side lobes that become too large. Side lobes become a nuisance beyond about 1301 degrees.

Figure 14:
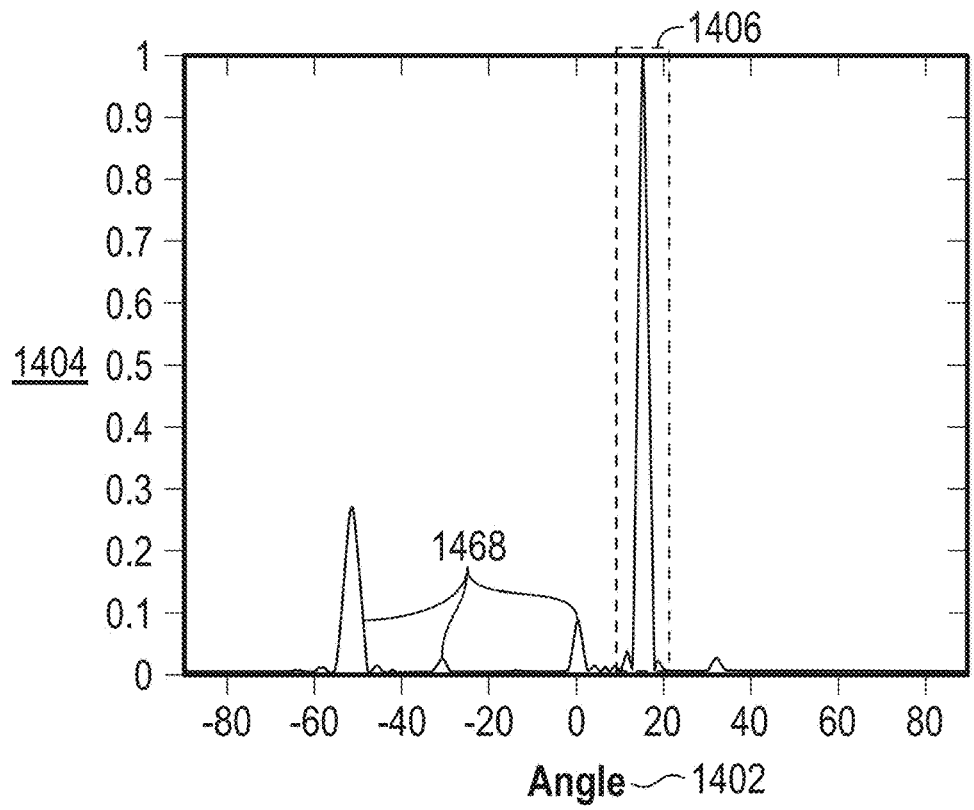
FIG. 14 is a graph of angle versus relative amplitude for main and side lobes of beam steering according to embodiments of the present disclosure.
Figure 15:
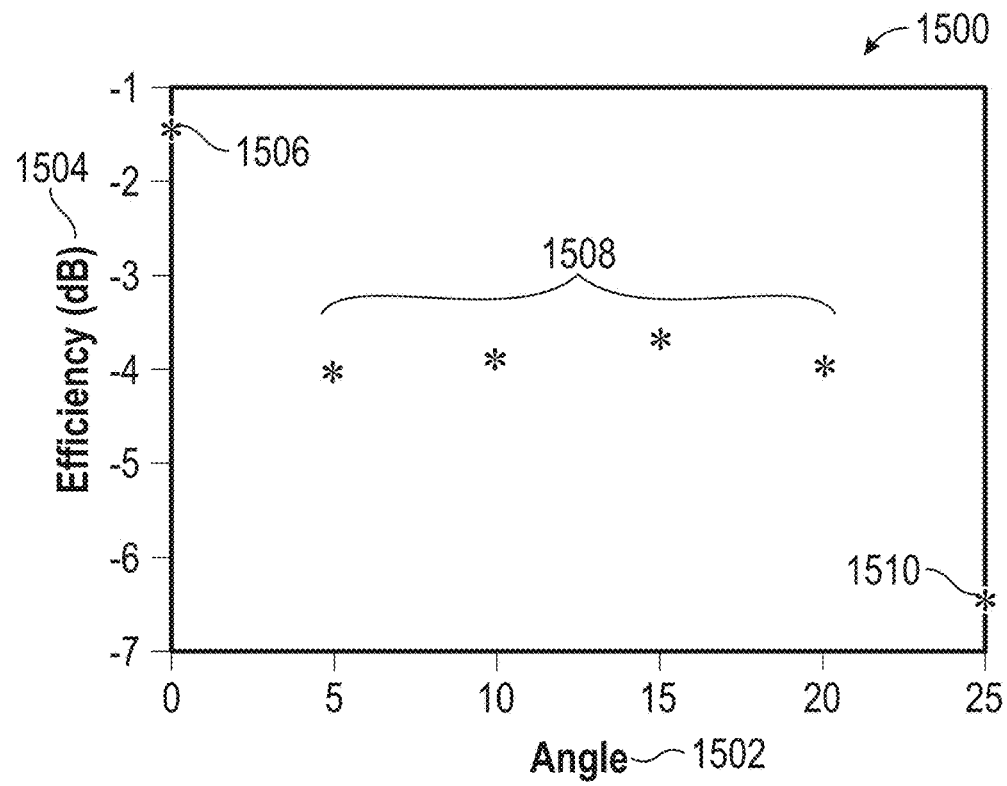
FIG. 15 is a graph of beam steering angle versus efficiency for embodiments of the present disclosure.

Efficiency of the array solution 900 of pillars 300, 400 is shown with respect to FIGS. 14-15. Overall efficiency is a function of reflection efficiency and main lobe efficiency. Referring to the incident light 902 shown in FIG. 9, it may be seen that some light does not enter into the pillars but goes into the gaps between pillars. The reflection efficiency of the array 900 in one embodiment is about 75%. That is, about 75% of the incident light is ultimately reflected back. Of that light, some percentage is in the main lobe, and the rest is in side lobes. As seen in the graph 1400 of FIG. 14, having angle of reflected light on the horizontal axis 1402 versus relative amplitude on the vertical axis 1404, the main lobe 1406 contains about 56% of the reflected light. The side lobes 1408 contain the rest. Overall efficiency of the array is the reflection efficiency multiplied by the main lobe efficiency, or for this embodiment an overall efficiency of 0.75*0.56=42%.

The overall efficiency changes with the angle of beam steering. As the beam is steered to greater angles, the efficiency tends to drop. The graph 1500 of FIG. 15 shows steering angle 1502 on the horizontal axis versus efficiency in dB on the vertical axis 1504. At 0 degrees beam steering as shown at 1506, the efficiency is about −1.4 dB (or about 75% of original light, with about 25% loss) into the main beam. As the steering angle grows, less light is reflected into main beam. At steering angles of about 5-20 degrees as shown at 1508, overall efficiency is about −4 dB (or about 40% of original light, with about 60% loss). Above 20 degrees, for example at 25 degrees shown at 1510, efficiency is about −6.5 dB (or about 25-20% of original light at −6 and −7 dB, respectively, with about 75-80% loss). Beyond about 25 degrees, the side lobes, as discussed above, become too large for effective beam steering.

Figure 16:
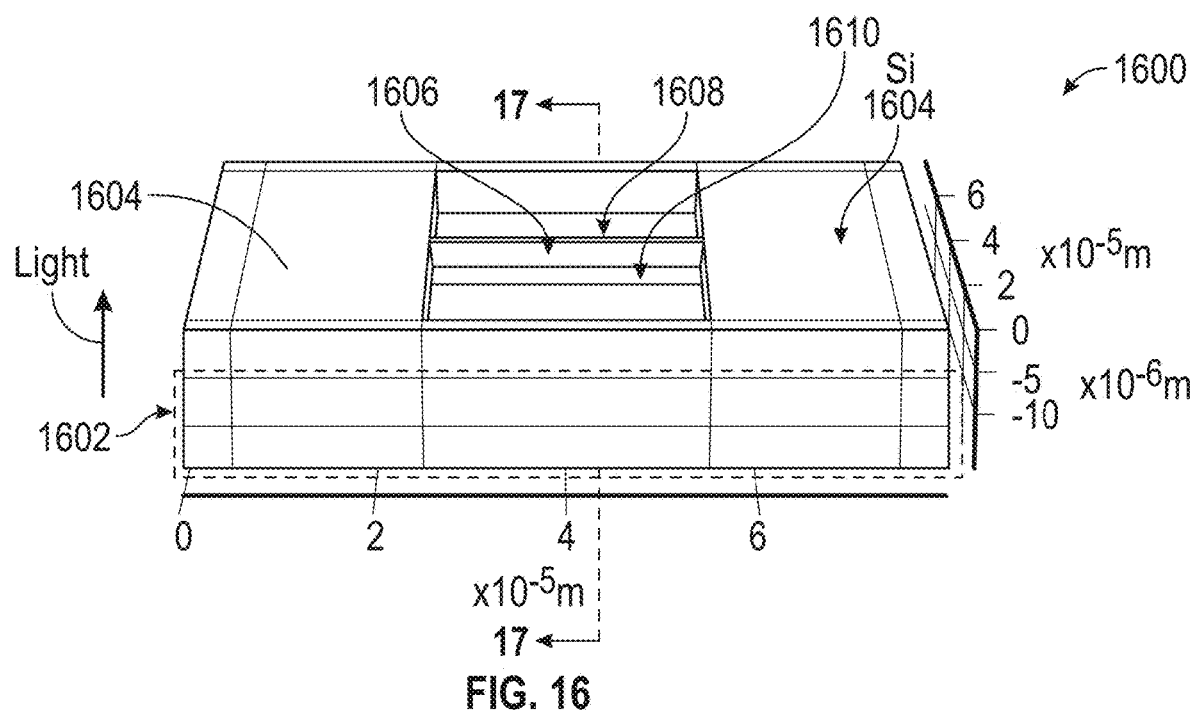
FIG. 16 is a perspective view of a beam steering apparatus according to an embodiment of the present disclosure.

In one embodiment, an array of pillars such as array 900 is air gapped with gaps between each adjacent pillar, and gaps between pillars and the substrate. An example of this is shown in FIG. 16. FIG. 16 shows a beam steering structure 1600 having an oxide substrate 1602, silicon support structures 1604, and suspended pillars 1606 with top heaters 1608. Oxide substrate 1602 in one embodiment comprises silicon dioxide ($SiO_2$). The pillars are in one embodiment pillars as pillars 300, 400 described above.

Figure 17:
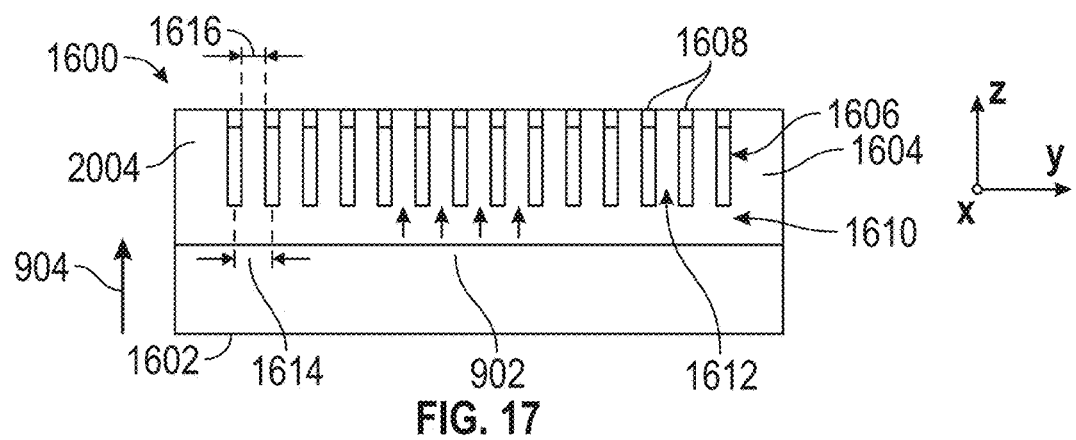
FIG. 17 is a view of the beam steering apparatus of FIG. 16 taken along lines 17-17 thereof.

Air gaps 1602 are used in one embodiment between adjacent pillars 1606 (see FIG. 17). Air gaps 1610 are also provided in one embodiment between the pillars 1606 and the oxide substrate 1602. The air gaps prevent heat from migrating from one pillar to an adjacent pillar, and from a pillar to the oxide substrate 1602. This allows the heating by heaters 1608 to be more efficient, in that the majority of the heat applied to the pillars remains in the pillars. As air is a poor thermal conductor, the air gaps allow for more precise control of heat applied to each pillar.

FIG. 17 illustrates a cross section taken along lines 17-17 of FIG. 16. As seen in FIG. 17, each pillar 1606 has an air gap 1612 between itself and an adjacent pillar 1606. Each pillar 1606 also has an air gap 1610 between it and oxide substrate 1602. The pillars 1606 are suspended between two support structures 1604 comprising, in one embodiment, silicon. Air gaps 1610 and 1612 are sized to reduce or eliminate thermal crosstalk between adjacent pillars and between pillars and the oxide substrate. While a larger air gap is better for the purposes of preventing crosstalk, there is a constraint on pitch between adjacent pillars due to size constraints that are present in creating small structures. Since the pitch between pillars is held to be smaller than the wavelength of light used in the beam steering structure 1600, in one embodiment, the pitch 1614 between pillars is about 1.5 microns. Pillar width in one embodiment is about 650 nm, so, the size of gap 1616 between pillar sides is about 850 nm. With a different pitch, the gap will be determined as pitch between pillars minus pillar width. Therefore, in the embodiments using a wavelength of about 1.57 microns, a pitch 1614 of 1.5 microns is used in one embodiment.

Figure 18:
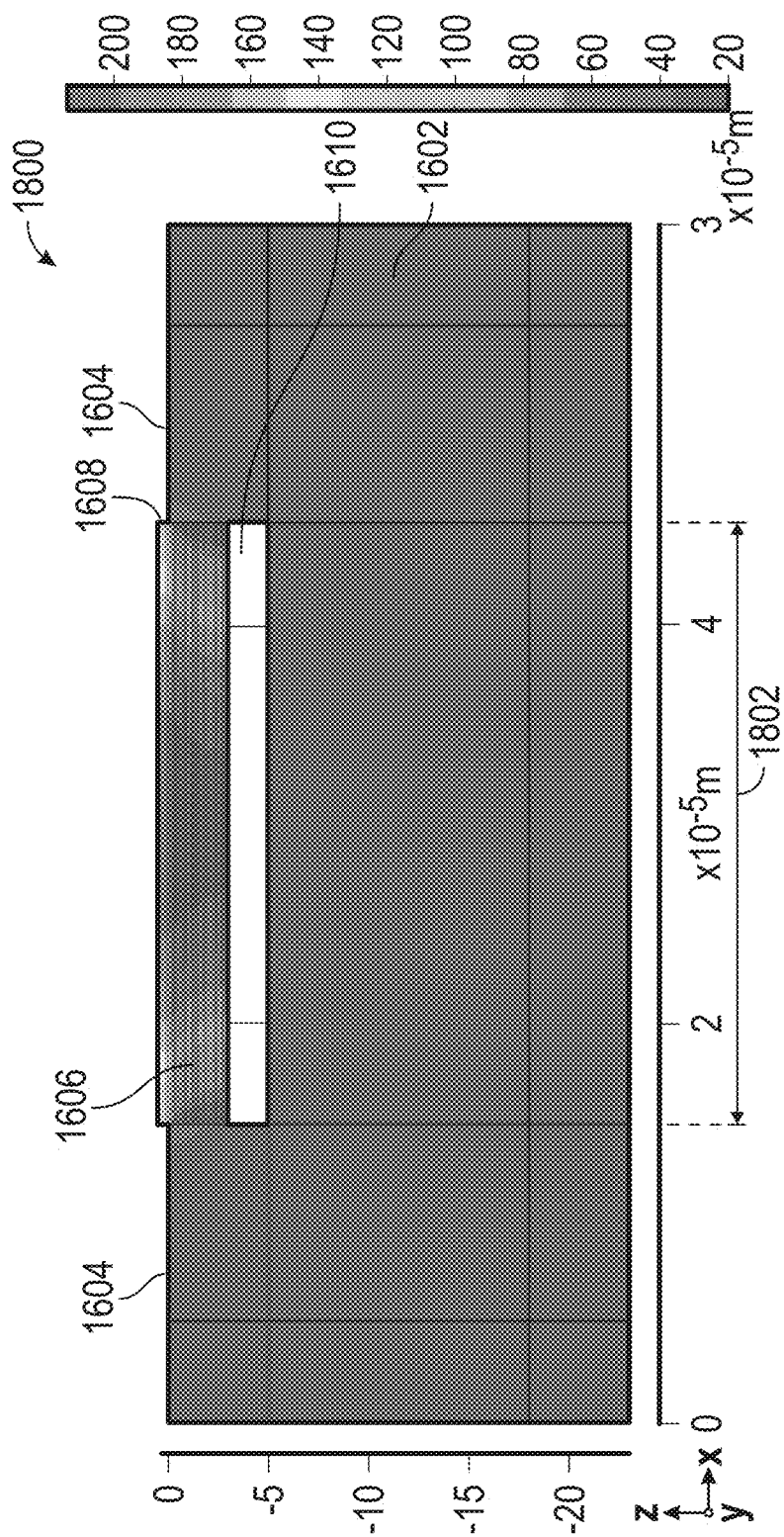
FIG. 18 is a side view of a beam steering apparatus with a first beam length according to an embodiment of the present disclosure.

Referring to FIG. 18, a pillar 1606 is shown in a structure 1800. Pillar 1606 is topped with heater 1608. Pillar 1606 is suspended between supports 1604 and extends for a grating length 1802 of 30 microns. As may be seen from the heat pattern in the pillar 1606, a majority of the pillar 1606, when heated by heater 1608, has a temperature elevated by about 100 to 200 degrees C. As is seen, more heat is present at the center of the pillar, due to thermal conduction to the supports 1604. The heater 1608 extends the entire 30 micron length 1802 of the pillar 1606. Most of the pillar has temperature raised close to 100 degrees or more above the temperature of the supports 1604 and substrate 1602.

Figure 19A:
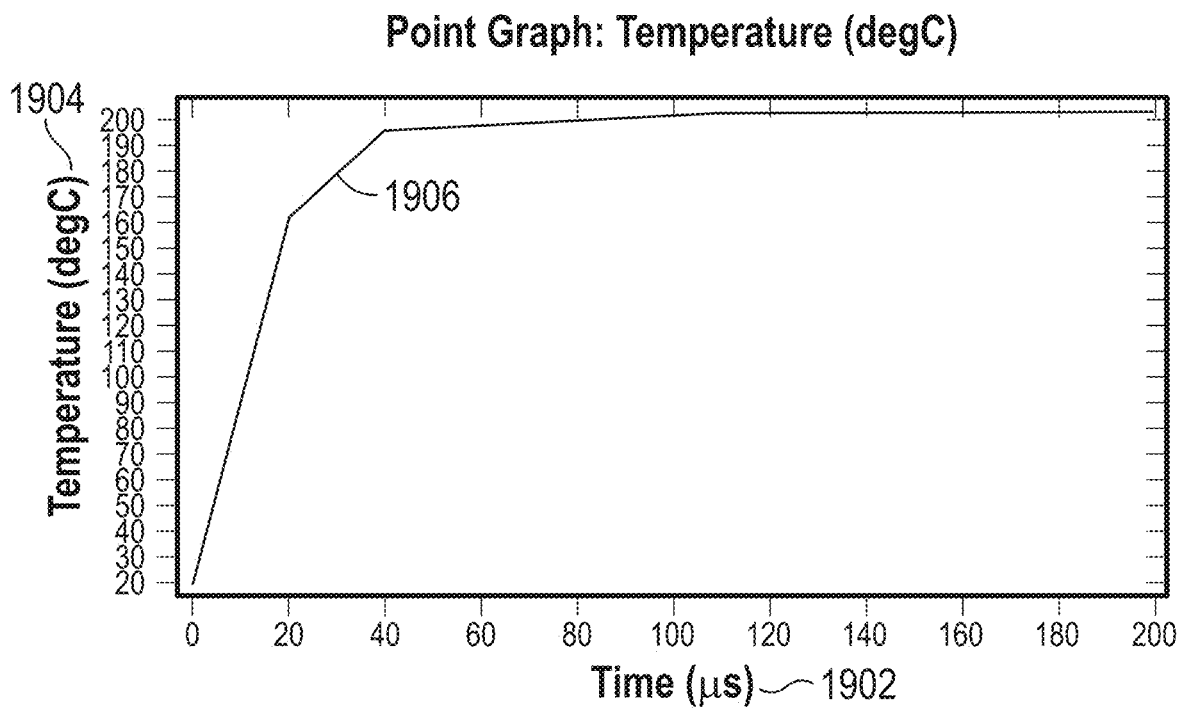
FIGS. 19A and 19B are plots of rise and fall times for the embodiment of FIG. 18.
Figure 19B:
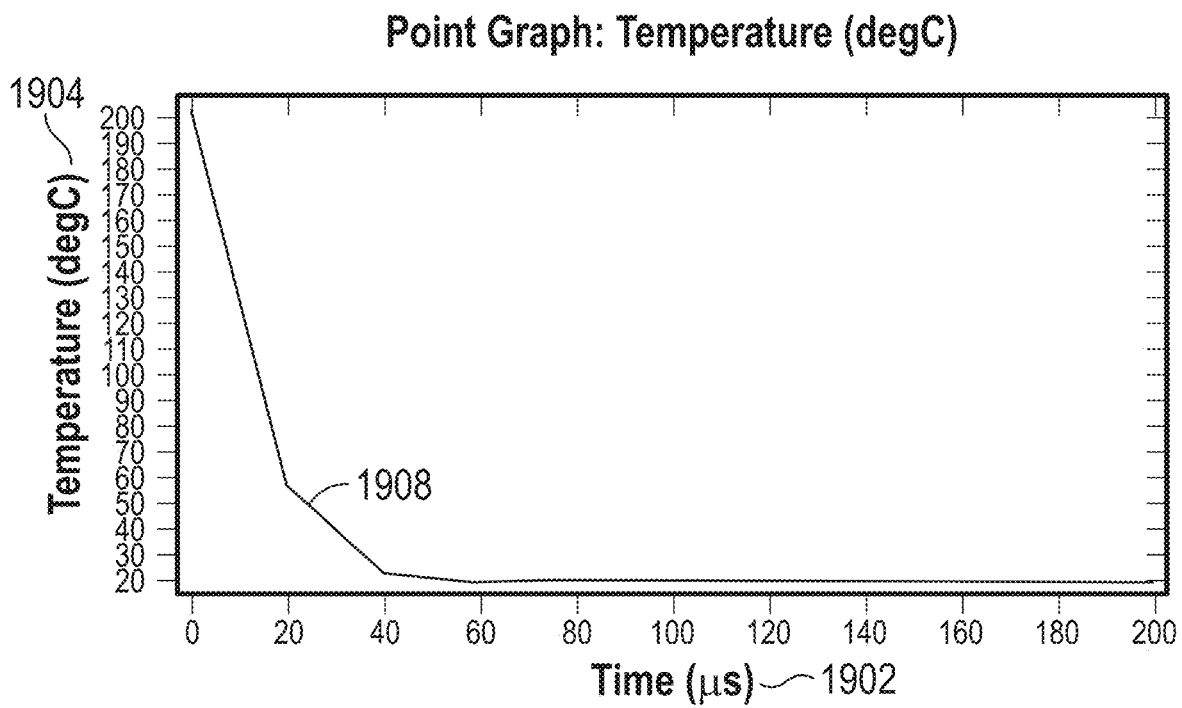

For this configuration, with a grating length 1802 of 30 microns, the voltage on each heater 1608 is about 0.1 volts per pillar 1606 to heat up the pillars 1606. Each heater consumes about 1.6 milliWatts (mW) of power per pillar 1606. Rise time and fall time for the pillars of FIG. 18 are shown in graph form as lines 1906 and 1908 in FIGS. 19A and 19B, respectively. In FIGS. 19A and 19B, time is shown on the horizontal axis 1902 versus temperature on the vertical axis 1904. Rise time to temperature is seen in FIG. 19A to be about 40 microseconds (p). Fall time from temperature to ambient is seen in FIG. 19B to be about 40 μs.

In one embodiment, 500 to 1000 pillars are used in a structure 1800. When the number of pillars increases, the range of the beam steering apparatus is increased, but the amount of power used is also increased. As the number of pillars increases, overall power consumption also increases. Accordingly, power consumption may limit the overall number of pillars in a design.

More pillars equals a longer range. Range depends on divergence. The steered beams will diverge with distance. At a divergence of 0.1 degrees, a person can be seen and scanned at 250 meters. At a divergence of 1 degree, a person cannot be resolved at 250 meters, because the spot size of the beam is too large.

Figure 20:
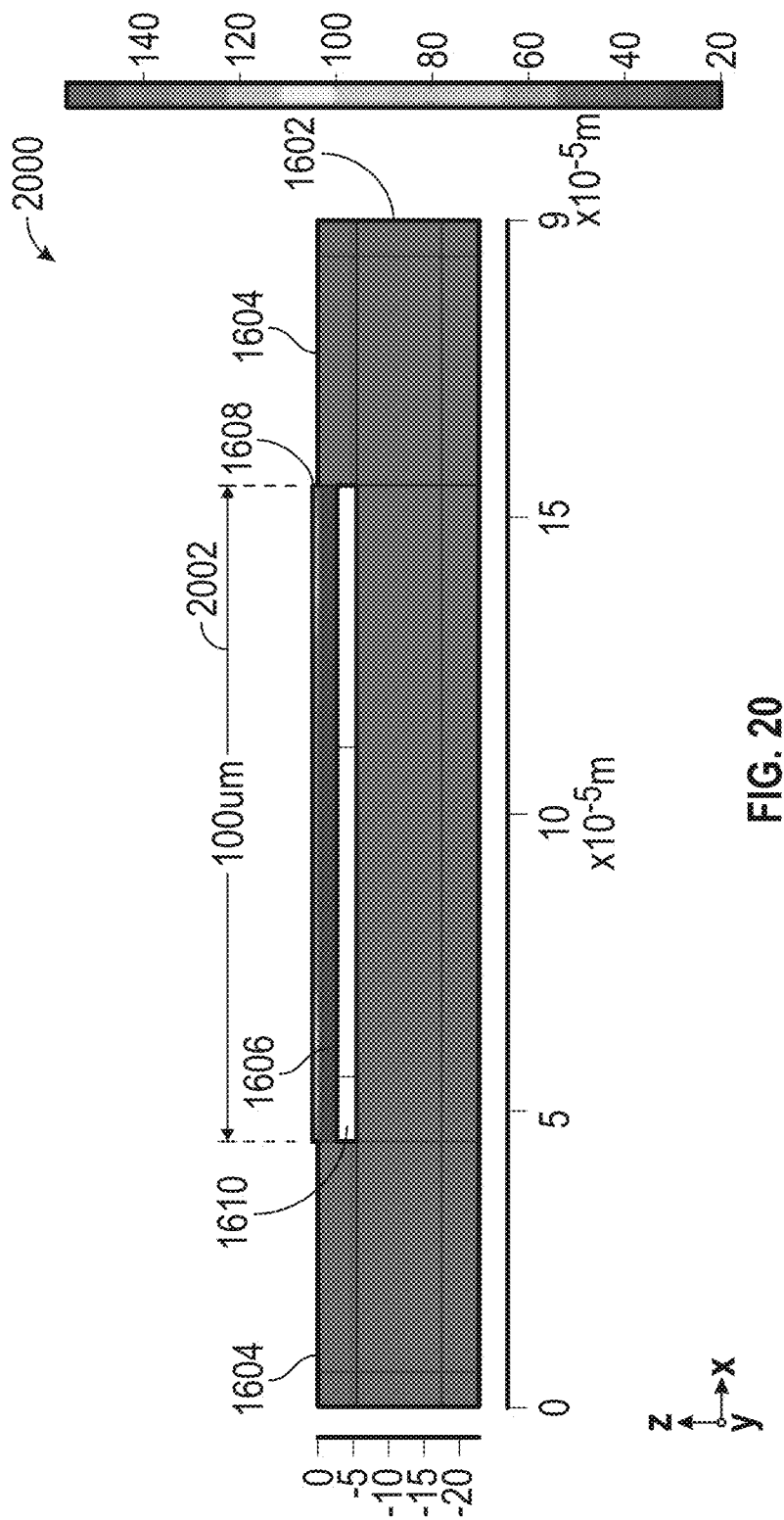
FIG. 20 is a side view of a beam steering apparatus with a second beam length according to an embodiment of the present disclosure.
Figure 21A:
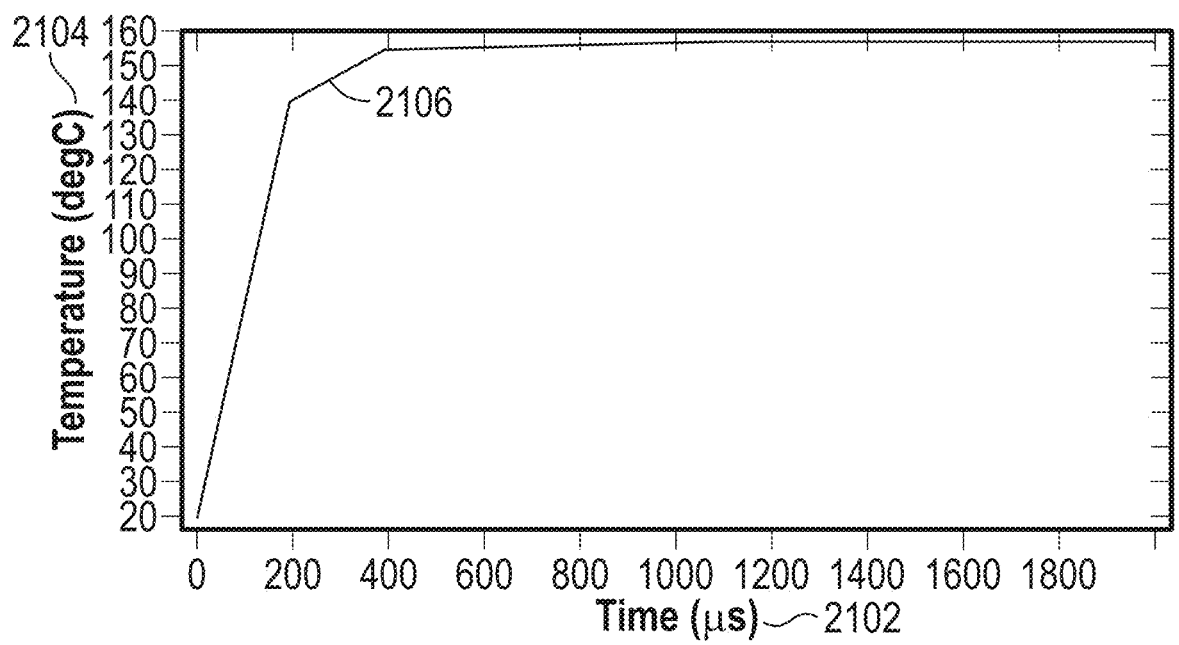
FIGS. 21A and 21B are plots of rise and fall times for the embodiment of FIG. 20.
Figure 21B:
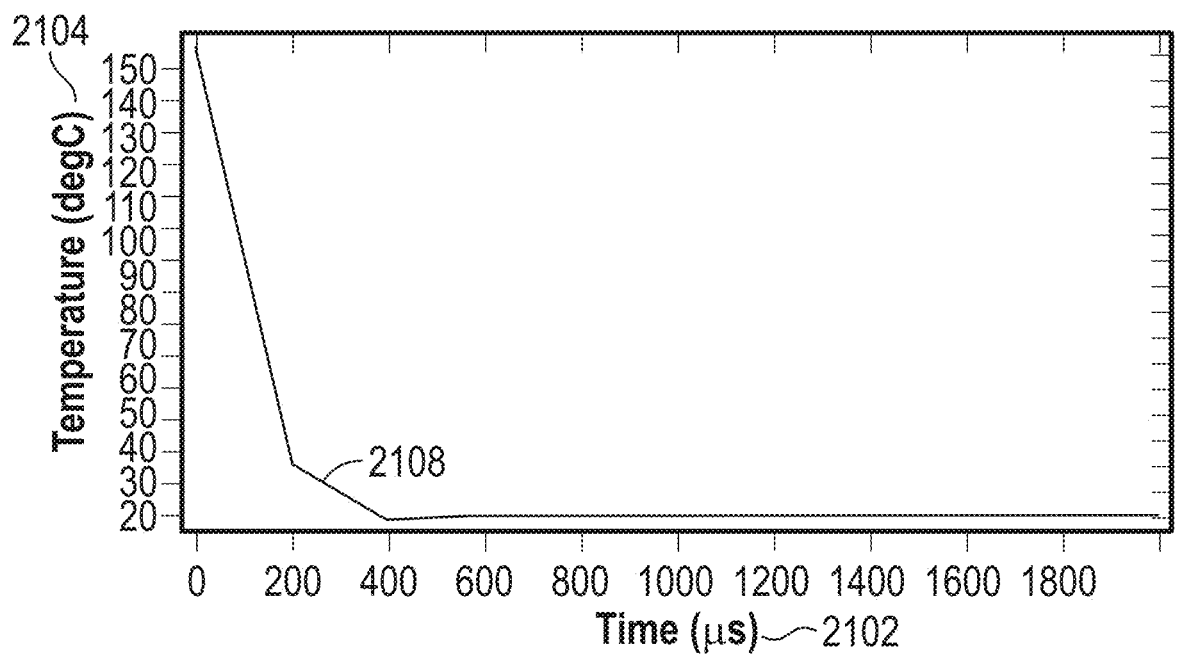

Beam divergence also depends on pillar length. FIG. 20 shows a beam steering structure similar to that of FIG. 18, but with a pillar length 2002 of 100 microns. Longer pillars result in smaller beam divergence, once again at the cost of space. With a pillar length 2002 of 100 microns, and the same heater voltage per pillar 1606 of 0.1 volts, the power used per pillar drops to 0.48 mW. The tradeoff in pillar length for less power consumption is a longer rise and fall time. Rise time and fall time for the pillars of FIG. 20 are shown in graph form as lines 2106 and 2108 in FIGS. 21A and 21B, respectively. In FIGS. 21A and 21B, time is shown on the horizontal axis 2102 versus temperature on the vertical axis 2104. Rise time to temperature is seen in FIG. 21A to be about 400 microseconds (p). Fall time from temperature to ambient is seen in FIG. 21B to be about 400 μs.

Various pillar lengths with heater voltages and power used by the heaters are shown in table form in Table 1. Table 1 shows a selection of pillar lengths, with resulting voltage per pillar, power per pillar, temperature change, switch time, speed, and power for a 1 square millimeter aperture. Typical desired power consumption per square millimeter is about 1 W. Therefore, for about a 1 W power consumption, a pillar length of 180 microns provides the desired power consumption, about 0.962 W. For this configuration, rise and fall times are about 800 us, for a switching speed of about 1.25 kiloHertz. Other lengths may be used, with various benefits and disadvantages in power consumption, speed, and the like.

TABLE 1

| Length (um) | Voltage (V) | Power for one grating (mW) | Temperature (° C.) | Switch Time (us) | Speed (kHz) | Power for 1 mm² aperture (W) |
|---|---|---|---|---|---|---|
| 20 | 0.08 | 1.5 | 110 | 20 | 50 | 49.95 |
| 60 | 0.1 | 0.8 | 120 | 150 | 6.666667 | 8.88 |
| 100 | 0.1 | 0.48 | 120 | 300 | 3.333333 | 3.1968 |
| 140 | 0.1 | 0.34 | 120 | 600 | 1.666667 | 1.61742857 |
| 180 | 0.1 | 0.26 | 120 | 800 | 1.25 | 0.962 |
| 220 | 0.1 | 0.21 | 110 | 1200 | 0.833333 | 0.63572727 |
| 260 | 0.1 | 0.18 | 110 | 1800 | 0.555556 | 0.46107692 |

Embodiments of the present disclosure provide thermally tunable metasurfaces with subwavelength-scale phase control. They provide beam steering for angles of −30 to 30 degrees, with about 40% efficiency in the main lobe, and have low thermal crosstalk. Power consumption for a 1 mm×1 mm aperture may be chosen to be about 1 Watt with an approximate switching speed of about 1 kHz.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A metasurface, comprising:
   a plurality of Bragg mirrors, each having a defect cavity therein, arrayed in a grid; and
   a heat source for each of the plurality of Bragg mirrors, each heat source positioned to selectively modulate heat applied to its respective Bragg mirror and to impart a different phase shift via the applied heat from the heat source.

2. The apparatus of claim 1, wherein the heat source is a gold heater.

3. The apparatus of claim 1, wherein each Bragg mirror comprises a first plurality of alternating layers of silicon (Si) and silicon nitride ($Si_3N_4$), and a second plurality of alternating layers of Si and $Si_3N_4$, the first and second plurality of alternating layers disposed on either side of the defect cavity.

4. The apparatus of claim 3, wherein the defect cavity comprises Si.

5. The apparatus of claim 3, wherein the defect cavity comprises alternating layers of Si and $Si_3N_4$, tapering a Bragg mirror period of the cavity from a first distance equivalent to a period of the first plurality of alternating layers to a second distance smaller than the first distance.

6. The apparatus of claim 1, wherein each Bragg mirror comprises a first plurality of alternating layers of silicon (Si) and diamond like carbon (DLC), and a second plurality of alternating layers of Si and DLC, the first and second plurality of alternating layers disposed on either side of the defect cavity.

7. The apparatus of claim 6, wherein the defect cavity comprises Si.

8. The apparatus of claim 6, wherein the defect cavity comprises alternating layers of Si and DLC, tapering a Bragg mirror period of the cavity from a first distance equivalent to a period of the first plurality of alternating layers to a second distance smaller than the first distance in a plurality of cavity layers.

9. The apparatus of claim 1, wherein the plurality of Bragg mirrors is suspended between silicon supports over a substrate, and wherein the plurality of Bragg mirrors has a pitch therebetween of about 1.5 microns, and including an air gap between adjacent Bragg mirrors and an air gap between Bragg mirrors and substrate.

10. An apparatus, comprising:
    a substrate; and
    a plurality of pillars connected to the substrate at each end thereof, disposed end to end and supported by support structures on the substrate, separated from each other and from the substrate by air gaps, and arrayed in a grid;
    each pillar comprising:
       a pair of Bragg mirrors having a defect cavity therebetween; and
       a heat source positioned to selectively modulate heat applied to its respective defect cavity and to impart a different phase shift via the applied heat from the heat source.

11. The apparatus of claim 10, wherein each Bragg mirror comprises a first plurality of alternating layers of silicon (Si) and silicon nitride ($Si_3N_4$), and a second plurality of alternating layers of Si and $Si_3N_4$, the first and second plurality of alternating layers disposed on either side of the defect cavity.

12. The apparatus of claim 11, wherein the defect cavity comprises Si.

13. The apparatus of claim 11, wherein the defect cavity comprises alternating layers of Si and silicon nitride $Si_3N_4$, tapering a Bragg mirror period of the cavity from a first distance equivalent to a period of the first plurality of alternating layers to a second distance smaller than the first distance.

14. The apparatus of claim 10, wherein each Bragg mirror comprises a first plurality of alternating layers of silicon (Si) and diamond like carbon (DLC), and a second plurality of alternating layers of Si and DLC, the first and second plurality of alternating layers disposed on either side of the defect cavity.

15. The apparatus of claim 14, wherein the defect cavity comprises Si.

16. The apparatus of claim 14, wherein the defect cavity comprises alternating layers of Si and DLC, tapering a Bragg mirror period of the cavity from a first distance equivalent to a period of the first plurality of alternating layers to a second distance smaller than the first distance.

17. A method of beam steering, comprising:
    providing an array of beam steering pillars, each pillar having a pair of Bragg mirrors surrounding a defect cavity; and
    thermally changing a refractive index of the cavities in a pattern to induce beam steering through constructive and destructive interference of reflected light from the beam steering pillars.

18. The method of claim 17, wherein thermally changing comprises heating each pillar of the array of beam steering pillars with an independent heat source for each of the pillars, each independent heat source heating its pillar cavity to a determined temperature to impart a phase shift of light entering the pillar via the applied heat from the heater.

19. The method of claim 17, wherein thermally changing comprises applying a pattern of temperatures to the array of beam steering pillars to change the refractive constant of each cavity in a sawtooth pattern to induce a pattern dependent beam steering angle.

20. The method of claim 17, wherein thermally changing allows a beam steering of −30 to 30 degrees.

* * * * *